(No Model.) 2 Sheets—Sheet 1.

J. L. MYERS.
LEAF STRIPPING MACHINE.

No. 476,234. Patented May 31, 1892.

Witnesses
E. Nottingham
J. G. Nottingham

Inventor
James L. Myers
By N. A. Simpson
Attorney (No Model.) 2 Sheets—Sheet 2.

J. L. MYERS.
LEAF STRIPPING MACHINE.

No. 476,234. Patented May 31, 1892.

Witnesses
Inventor
James L. Myers.
Attorney ated May 31, 1892.

UNITED STATES PATENT OFFICE.

JAMES L. MYERS, OF BOSTON, MASSACHUSETTS.

LEAF-STRIPPING MACHINE.

SPECIFICATION forming part of Letters Patent No. 476,234, dated May 31, 1892.

Application filed March 30, 1891. Serial No. 387,023. (No model.)

*To all whom it may concern:*

Be it known that I, JAMES L. MYERS, of Boston, in the county of Suffolk and State of Massachusetts, have invented certain new and useful Improvements in Leaf-Stripping Machines; and I do hereby declare the following to be a full, clear, and exact description of the invention, such as will enable others skilled in the art to which it appertains to make and use the same.

My invention relates to an improvement in leaf-stripping machines, and has for its object the stripping of leaves from the stalk plants, especially from the stalks of the ramie; and to this end it consists in a novel machine in which the stalks with the leaves upon them are fed until the leaves have been removed, when the machine is reversed and the stalks are run out again.

It further consists in certain novel features of construction and combination of parts as will be hereinafter described, and pointed out in the claims.

Figure 1:
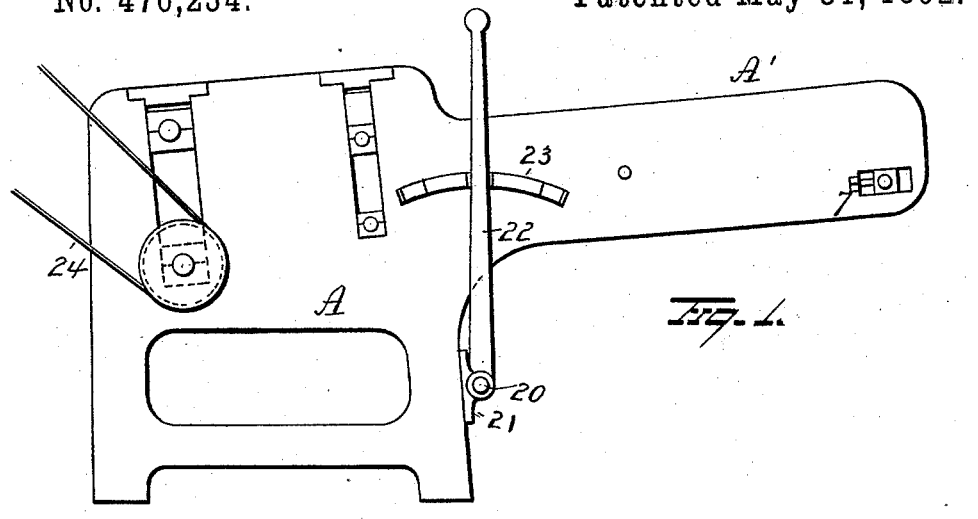
Figure 2:
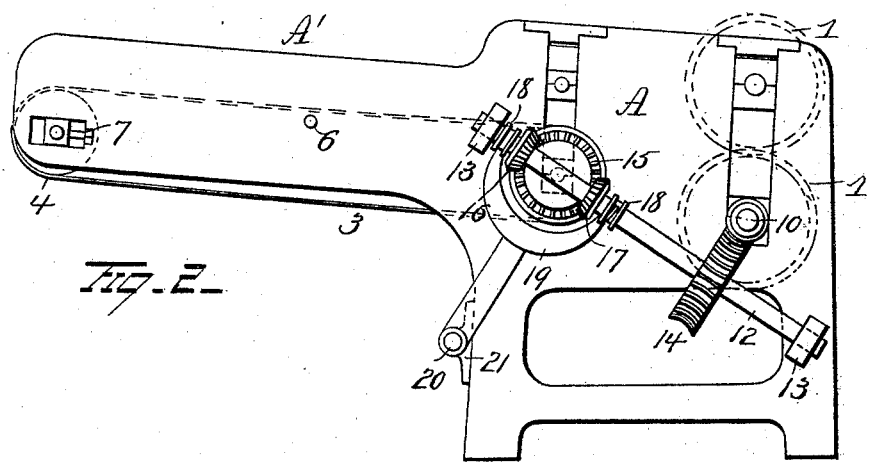
Figure 3:
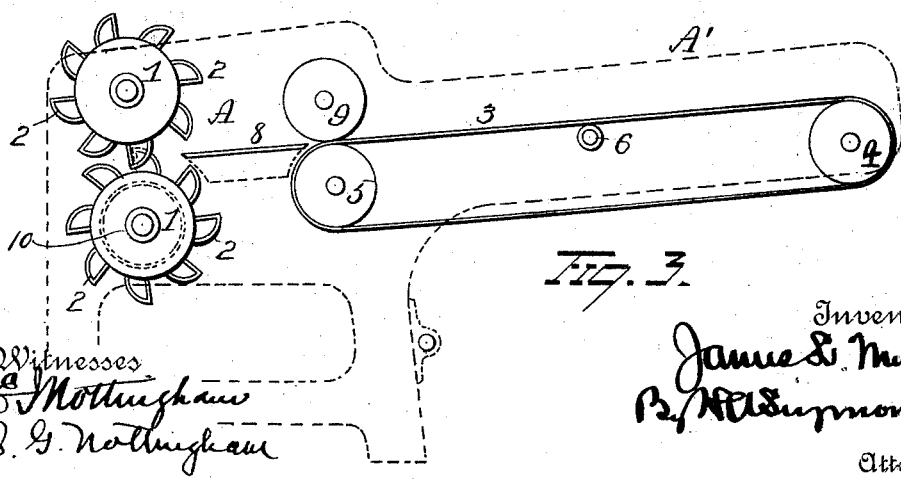
Figure 4:
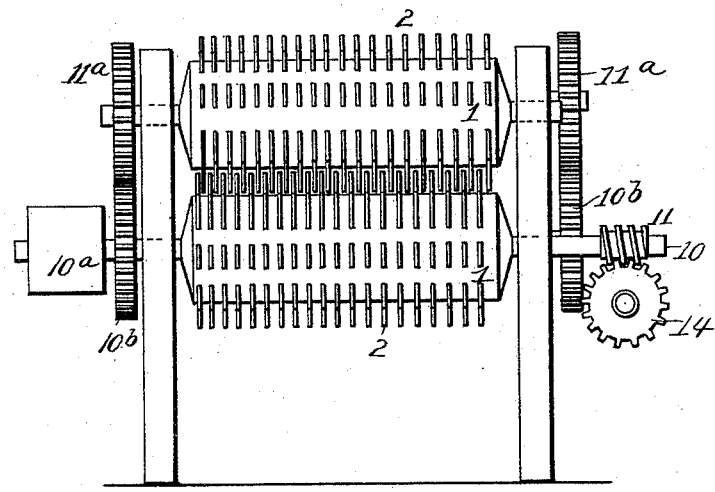
Figure 5:
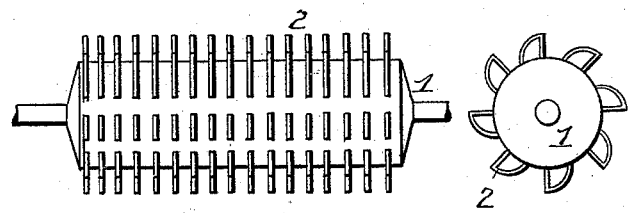

In the accompanying drawings, Figure 1 is a left-side view of the machine. Fig. 2 is a right-side view showing the reverse-feed motion and its gearing. Fig. 3 is a section through the machine, showing a cross-section of the stripping-cylinder. Fig. 4 is a view of the machine through the line of the stripping-cylinders, and Fig. 5 is a detached view of one of the stripping-cylinders and a cross-section of the same.

A represents the frame of the machine, and A' is a table projecting from the front end of the frame. A pair of stripping-cylinders 1 1 is journaled in the rear end of the frame. The teeth 2 2 on these cylinders are preferably shaped substantially as shown, having one straight edge and one rounded edge, and so arranged that the teeth on the two cylinders will intermesh with one another and remove the leaves and at the same time have sufficient clearance between them for the passage of the stalks undisturbed by the teeth. An endless belt or apron 3 is carried on rollers 4 and 5, journaled in the table A'. A smaller roller 6 supports this apron at the middle, and an adjusting device 7 is provided for shifting the roller 4, whereby the tension of the apron is regulated. The stalks to be stripped of their leaves are placed on this belt or apron, and by its forward motion carried onto the feed-plate 8 and thence between the stripping-cylinders 1 1. To further facilitate the feed of the stalks to the cylinders, an upper feed-roller 9 is revolubly supported just above roller 5, and is adapted to coact with the latter to force the stalks forward or backward. This roller 9 is made yielding by means of a rubber or leather covering, and not only does it grip the stalks, but also by its contact with the roller 5, it is rotated and whatever passes between it and the roller 5 is securely held and forced forward or backward, as the case may be.

The shaft 10, on which the lower cylinder 1 is mounted, is provided with a driving-pulley 10ᵃ at one end, through which motion is given to the entire machine and gear-wheels 10ᵇ, through which motion is given to wheels 11ᵃ, and at its opposite end this shaft is furnished with a worm-wheel 11. The shaft 12 on the corresponding end of the machine is journaled in the bearings 13 13 and has the worm gear-wheel 14 affixed thereon and in mesh with the worm-wheel 11, through which motion is imparted to the shaft. The shaft upon which the roller 5 is mounted is provided with a bevel gear-wheel 15, and the shaft 12 has a pair of bevel-pinions 16 and 17 slidingly keyed thereon, whereby they are alternately thrown in and out of mesh with the wheel 15, accordingly as the endless apron is to be driven forward to feed the stalks or reversed to withdraw them. These pinions are each furnished with a grooved collar 18 18, and the yoke 19, secured to the rocking shaft 20, engages these collars and keeps them always at the required distance apart, so that the two pinions are simultaneously operated by this yoke and slid in or out of engagement with the gear-wheel 15. The rocking shaft is supported in bearings 21 21, and has a reversing-lever 22 on its opposite end, by means of which the pinions are shifted to reverse the motion of the apron, and this lever is held in position by the toothed segment 23.

The machine is set in motion by the belt 24, and the stripping-cylinders and feed-rollers are rotated until the stalks have passed between the cylinders and nearly through the feed-rollers. Then the lever 22 is reversed, throwing the pinion 16, which before has driven the gear-wheel 15, out of engagement with the latter and the pinion 17 into engagement. This gives the apron the opposite motion and withdraws the stalks from the machine. The result is to entirely strip the stalks and remove them from the machine; and by means of my present invention I am able to do it rapidly and effectually with the use of ordinary power and without more than usual care and attention.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. The combination, with a frame, stripping-cylinders, and feed mechanism, of a rotary shaft having gearing thereon for communicating motion from one of the cylinders to the feed mechanism, and reversing mechanism for reversing the motion of said mechanism, substantially as set forth.

2. The combination, with a frame, stripping-cylinders, driving-pulley on the shaft of one of the cylinders, and a worm-wheel on the opposite end, of an endless feed-apron, rollers upon which the latter is carried, a bevel gear-wheel on the shaft on one of the rollers, a shaft having a worm gear-wheel meshed with the worm-wheel, bevel-pinions slidingly mounted on said shaft, a yoke having loose connection with the pinions and adapted to throw one out of mesh and the other in mesh with the bevel gear-wheel, and a lever for operating this yoke, substantially as set forth.

3. The combination, with a frame, a table, toothed stripping-cylinders, and feed-plate, of an endless feed-apron, yielding feed-roller, supporting-roller, and adjustable tension-roller, a shaft having a worm gear-wheel thereon meshed with a worm-wheel on the shaft of one of the cylinders, sliding bevel-pinions, yoke for moving said pinions on the shaft alternately in and out of engagement with a bevel gear-wheel on the shaft of one of the apron-rollers, a lever for operating the yoke, and a toothed segment, by means of which the lever is locked, substantially as set forth.

In testimony whereof I have signed this specification in the presence of two subscribing witnesses.

JAMES L. MYERS.

Witnesses:
C. S. DRURY,
G. F. DOWNING.